United States Patent [19]

Dillmann et al.

[11] Patent Number: 4,865,803
[45] Date of Patent: Sep. 12, 1989

[54] GAS DISCHARGE SYSTEM FOR THE SAFETY CONTAINMENT OF A NUCLEAR REACTOR

[75] Inventors: Hans-Georg Dillmann, Eggenstein-Leopoldshafen; Hans Martinsteg, Rueken, both of Fed. Rep. of Germany

[73] Assignee: Kernforschungszentrum Karlsruhe GmbH, Karlsruhe, Fed. Rep. of Germany

[21] Appl. No.: 106,644

[22] Filed: Oct. 9, 1987

[30] Foreign Application Priority Data

Oct. 17, 1986 [DE] Fed. Rep. of Germany ....... 3635342

[51] Int. Cl.$^4$ .......................... G21F 9/02; B01D 50/00
[52] U.S. Cl. .................... 376/314; 376/313; 55/485; 55/503; 55/511; 55/525
[58] Field of Search ............... 376/313, 318; 55/485, 55/483, 525, 503, 506, 511

[56] References Cited

U.S. PATENT DOCUMENTS

| | | | |
|---|---|---|---|
| 3,066,462 | 12/1962 | Yap et al. | 55/485 |
| 3,353,341 | 11/1967 | Stripp | 55/503 |
| 3,430,771 | 3/1969 | Dreher | 55/483 |
| 3,541,767 | 11/1970 | Getzin et al. | 55/483 |
| 3,780,872 | 12/1973 | Pall | 55/525 |
| 3,847,577 | 11/1974 | Hansen | 55/485 |
| 4,133,651 | 1/1979 | Hoy et al. | 55/485 |
| 4,198,221 | 4/1980 | Catlin et al. | 376/314 |
| 4,233,044 | 11/1980 | Allan | 55/483 |
| 4,344,784 | 8/1982 | Deckas et al. | 55/483 |
| 4,416,850 | 11/1983 | Kodama et al. | 376/313 |

*Primary Examiner*—Harvey E. Behrend

[57] ABSTRACT

A pressurized gas discharge system for the safety containment of a nuclear reactor includes a conduit structure connected to the containment and consisting of a plurality of modular conduit units which are flanged together end-to-end, each having flanged side openings with filter frame members including stainless steel fiber filter packs flanged thereto in end-to-end relationship. The filter packs extend fully across the frame members and have their circumferential edges clamped between the flanges of adjacent frame members so that in the clamped areas the filter packs are reduced in thickness to a fraction of their original thickness, the flanges having U-shaped members disposed on their faces such that the legs of the U-shaped member project toward the adjacent flange and provide two seal strips with the edges of the filter packs compressed therebetween.

4 Claims, 3 Drawing Sheets

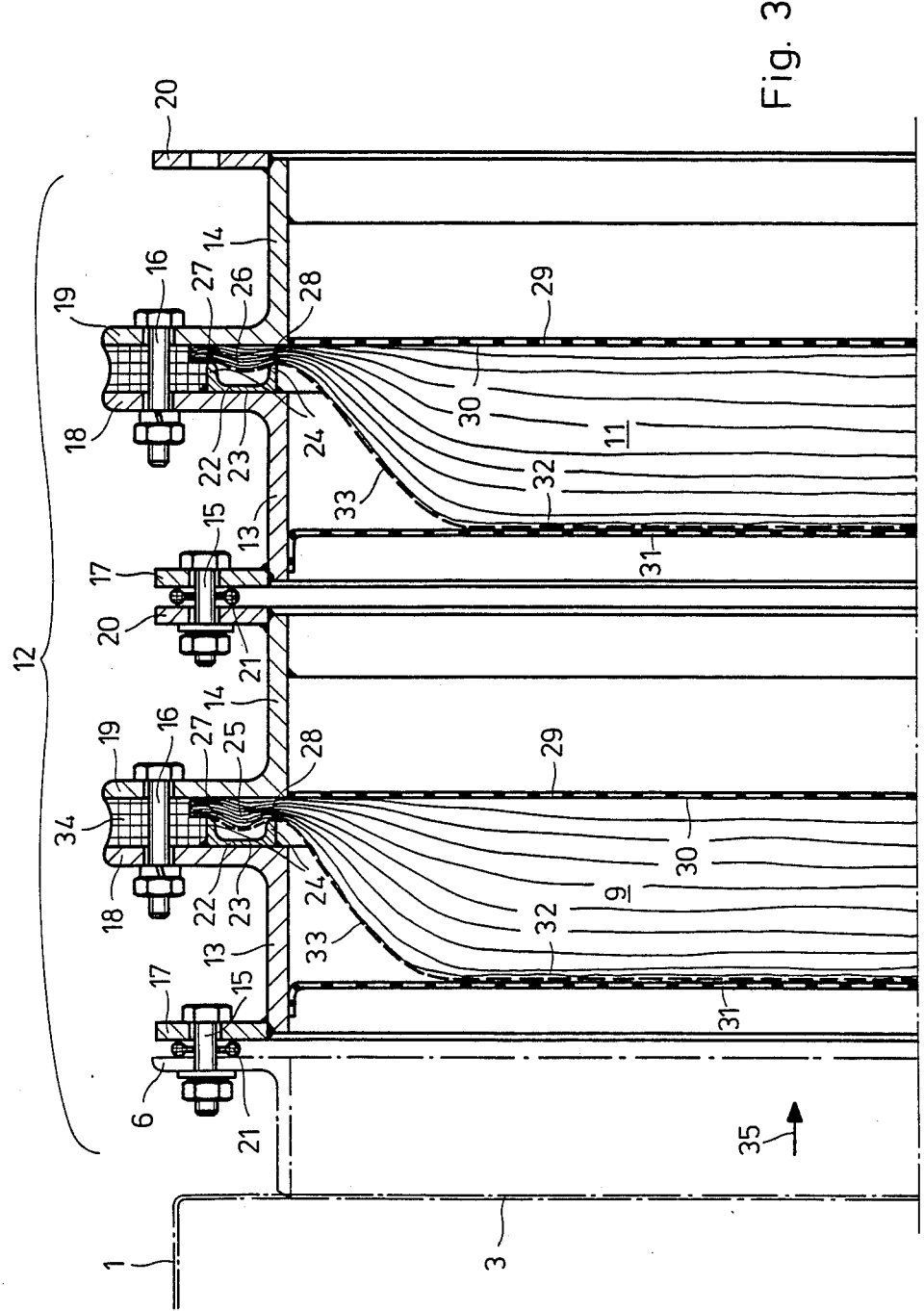

GAS DISCHARGE SYSTEM FOR THE SAFETY CONTAINMENT OF A NUCLEAR REACTOR

BACKGROUND OF THE INVENTION

The present invention relates to a pressurized gas discharge system for the safety containment of a nuclear reactor which includes a conduit having a filter arrangement with serially arranged filter elements consisting of stainless steel fiber packs.

It is assumed that, after a reactor melt-down accident, the gas pressure within the safety containment of a nuclear reactor will increase within a couple of days to a degree that gas should be discharged therefrom. There are provided therefore discharge apparatus for limiting or reducing the pressure by way of a duct which provides communication of the containment interior and the atmosphere, that is, a discharge stack via a filtering system. The present invention relates to such a filtering system.

The filtering systems utilized so far are not capable of safely handling the discharge of the gases under the given conditions involving a combination of water, steam, high temperatures and radiation.

It is therefore the object of the present invention to provide a gas discharge system for the safety containment of a nuclear reactor which, with the use of stainless steel filter element packs, will permit to limit the containment pressure over a longer period of time and which remains functional over the whole period. Such a system needs to be resistant to high temperatures and corrosion, require little servicing and be highly reliable.

SUMMARY OF THE INVENTION

In a pressurized gas discharge system for the safety containment of a nuclear reactor which includes a conduit structure connected to the safety containment for receiving the gases to be discharged from the interior thereof and which consists of a plurality of modular conduit units flanged together end-to-end and provided with side openings with circumferential flanges, a plurality of frame members are flanged to the sides of the modular conduit units in end-to-end relationship and in alignment with the side openings of the modular conduit units and filter packs of stainless steel fibers are clamped with their circumferential edges between the flanges of adjacent frame members such that the filter packs extend fully across the frame members, one of the flanges of adjacent frame members having a U-shaped member disposed on its face such that the legs thereof project toward the flange of the adjacent frame member and firmly engage the circumferential edges of the filter packs which are compressed thereby to a fraction of their original thickness and form with the legs of the U-shaped member a double seal strip between the frame member flanges.

The system according to the present invention provides for a substantial improvement in nuclear plant safety and reduces the remaining risks without the need for additional emergency measures. The system according to the invention additionally provides for long-term effectiveness and reliable operation even under the described extreme conditions as they would occur during a melt-down accident.

SHORT DESCRIPTION OF THE DRAWINGS

FIG. 3 is a partial cross-sectional view showing the clamping of the stainless steel fiber packs between the frame elements flanged to the conduit units.

DESCRIPTION OF A PREFERRED EMBODIMENT

Figure 1:
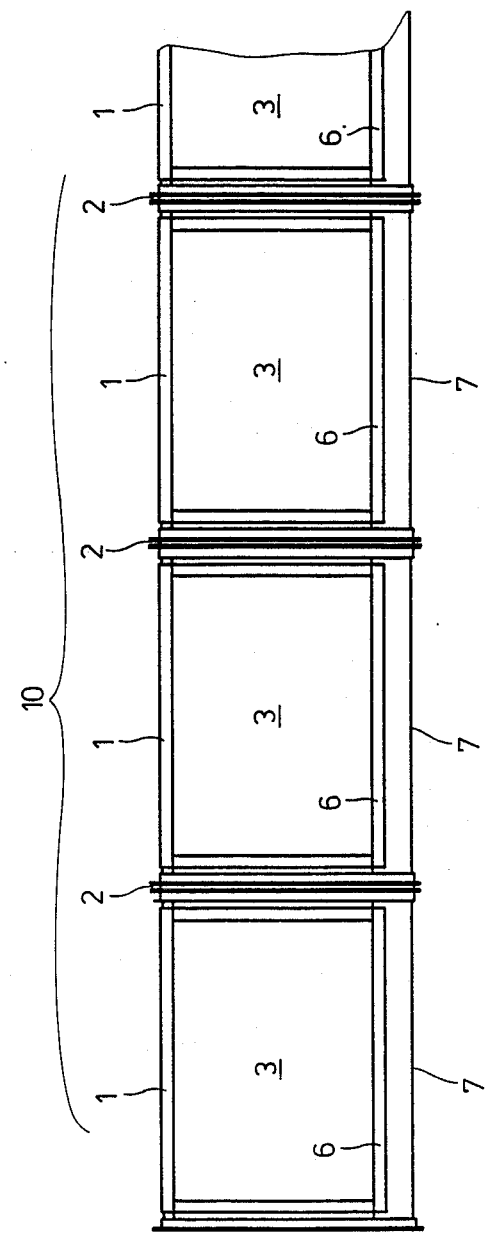
FIG. 1 is a side view of modular conduit units flanged together in series and showing the side openings of the conduit units.
Figure 2:
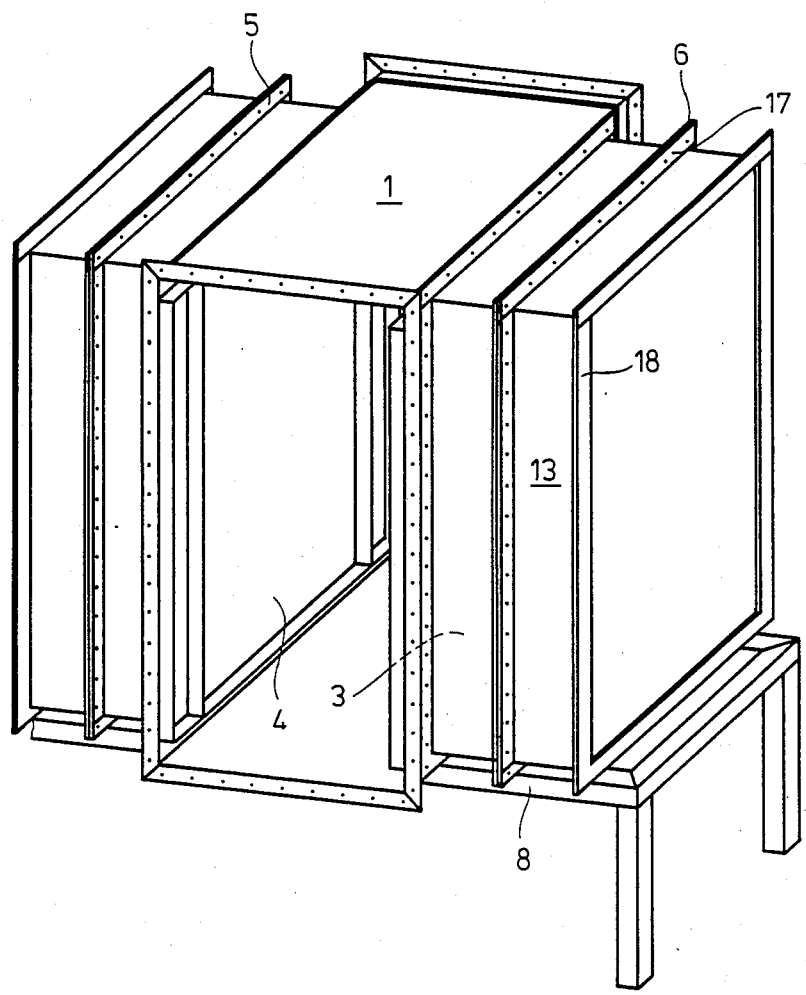
FIG. 2 is a perspective view of a conduit unit.

As shown in FIG. 1 a plurality of modular conduit units 1 are screwed to one another so as to be sealed by gaskets 2 disposed at their interfaces. The conduit units as such are shown in FIG. 2. Together they form discharge conduit structure 10 providing a discharge path from the interior of a reactor safety containment to the atmosphere, generally by way of an exhaust stack associated with the reactor plant. At their sides the modular conduit units have side openings 3 and 4 bounded by flanges 5 and 6. The bottoms 7 of the modular conduit units 1 are preferably recessed so that they are somewhat lower than the lower edge of the side openings 3 and 4 as shown in FIG. 1 so as to retain therein any condensate. The flanges 5 and 6 consist of angle iron frames which are welded to the units 1. All the units 1 are supported on a support frame 8.

The conduit units have attached thereto filter stages 12 each including a prefilter 9 and a main filter 11 both consisting of stainless steel fiber packs as filter elements. The filters 9 and 11 as shown in FIG. 3 are stainless steel fiber mats whose fibers may have a diameter down to 2 μm.

The filter stages 12 of the conduit structure 10 shown in FIG. 1 are arranged in a particular manner. The filter stages 12 are formed by identical frame members 13 and 14 which are mounted together by bolts 15 and 16 in a manner such that they are sealed with respect to one another. The frame members 13 and 14 consist of hollow sheet metal casings which have flanges 17, 18 and 19, 20 welded to the opposite ends thereof. The frame member 13 is bolted with its flange 17 to the flange 6 or, on the opposite side of the unit 1, flange 5 (see FIG. 2), with the gasket 21 sealingly disposed therebetween.

Further bolting connections of the filter stages 12 are made in the same manner. A U-shaped member 22 is welded with its back side 23 to the flat face at the inner end of flange 18 such that the legs 24 of the U-shaped member project from the flange face. The edges 25 and 26 of the filter packs 9 and 11 are disposed between the projecting legs 24 of the U-shaped member 22 and the flange 19 of the adjacent frame member 14 so that, upon tightening of the bolts 16, the edges 25, 26 of the filters are firmly clamped therebetween thereby forming circumferential concentric seals 27 and 28 providing for a double seal structure. In the process the circumferential edges 25 and 26 of the filters are compressed to a fraction of their original thickness.

The flanges 19 of the frame members 14 have perforated retaining plates 29 welded thereto at their inner edges so that the filters 9 and 11 may be flatly supported thereby at their flat downstream sides 30. Additional perforated plates 31 are inserted into the interior of the frame members 13 which engage the filters 9 and 11 at their curved upstream side 32. The curved upstream side 32 is further provided with a stainless steel cloth 33 which follows the curved filter surface and engages and retains the filter fibers so as to prevent fraying of the filter packs. The stainless steel cloth 33 is clamped between the flanges 18 and 19 together with the filter edges 25 and 26.

The space remaining between the flanges around the filter edges 25 and 26 in the area of the bolts 16 is filled with a heat resistant sealing material which is cast into that space. The normal flow direction is given by arrow 35, that is, the discharge air is supplied to the filter stages from the curved side 32 of the filters as shown in FIG. 3, but the filter stages may also be arranged in the manner opposite to that shown in FIG. 3.

The conduit unit together with the filter elements on their sides are disposed in a discharge collection chamber which is in communication with an exhaust stack so that the discharge air, after passage through the filter elements, is collected for discharge through the exhaust stack.

REFERENCE NUMERALS

1: Modular conduit unit
2: Gaskets
3, 4: Side openings
5, 6: Flanges
7: Recessed bottom
8: Support frame
9: Prefilter
10: Discharge conduit structure
11: Main filter
12: Filter stages
13, 14: Frame members
15, 16: Bolts
17, 18: Flanges
19, 20: Flanges
21: Gasket
22: U-shaped member
23: Back side
24: Legs
25, 26: Edges
27, 28: Seals
29: Perforated retaining plate
30: Flat downstream side
31: Perforated plate
32: Curved filter side
33: Stainless steel cloth
34: Sealing material
35: Flow direction arrow.

What is claimed is:

1. A pressurized gas discharge system for the safety containment of a nuclear reactor with a conduit structure connected to the containment and providing a communication path with the interior thereof and a filter structure including filter stages with serially arranged filter elements consisting of stainless steel fiber packs, comprising:
   (a) a plurality of modular conduit units sealingly flanged together in series and forming said conduit structure, each of said modular units having a side opening at least at one side thereof with flanges formed around each side opening,
   (b) frame members provided with flanges at opposite ends thereof and mounted to said modular unit flanges and serially flanged together,
   (c) stainless steel fiber packs disposed within said frame members and having circumferential edges disposed between the opposite flanges of adjacent frame members, said stainless steel fiber packs extending fully across the interior of the frame members and having their circumferential edges clamped between said flanges so as to have a thickness which is a fraction of the normal stainless steel fiber pack thickness, and
   (d) U-shaped members circumferentially welded onto the inner face areas of the frame member flanges such that the legs of the U-shaped members project from said flange face and engage the circumferential edges of said stainless steel fiber packs thereby to provide a gas seal with said stainless steel fiber pack edges.

2. A pressurized gas discharge system according to claim 1, wherein a perforated metal plate extends across each of said frame members at one side of said fiber pack in abutment with said fiber pack and in radial alignment with one of the flange surfaces, wherein a stainless steel cloth is disposed on the other, curved side of said fiber pack, and wherein the circumferential edges of said steel cloth are also engaged between said flanges.

3. A pressurized gas discharge system according to claim 1, wherein said filter packs are so arranged that said curved filter side is the upstream filter end.

4. A pressurized gas discharge system according to claim 1, wherein the areas around the filter pack circumferential edges between said flanges is filled with a cast-in sealing compound.

* * * * *